(12) United States Patent
Jähnke et al.

(10) Patent No.: US 7,971,266 B2
(45) Date of Patent: Jun. 28, 2011

(54) METHOD FOR PROVIDING A PROBE FOR A PROBE-MICROSCOPIC ANALYSIS OF A TEST SAMPLE IN A PROBE MICROSCOPE AND ARRANGEMENT WITH A PROBE MICROSCOPE

(75) Inventors: Torsten Jähnke, Berlin (DE); Torsten Müller, Berlin (DE); Detlef Knebel, Berlin (DE); Kathryn Poole, Berlin (DE)

(73) Assignee: JPK Instruments AG, Berlin (DE)

( * ) Notice: Subject to any disclaimer, the term of this patent is extended or adjusted under 35 U.S.C. 154(b) by 335 days.

(21) Appl. No.: 12/320,114

(22) Filed: Jan. 16, 2009

(65) Prior Publication Data
US 2009/0300807 A1    Dec. 3, 2009

(30) Foreign Application Priority Data
Jan. 18, 2008   (DE) ........................ 10 2008 005 248

(51) Int. Cl.
*G01N 13/16* (2006.01)
*G01N 13/10* (2006.01)
*G01Q 60/24* (2010.01)
*G01Q 60/38* (2010.01)

(52) U.S. Cl. .................... 850/1; 850/5; 850/33; 850/40; 73/105; 73/866.5; 250/306

(58) Field of Classification Search .................. 850/1, 5, 850/33, 40; 73/105, 866.5; 250/306
See application file for complete search history.

(56) References Cited

U.S. PATENT DOCUMENTS

| | | | |
|---|---|---|---|
| 5,331,275 A * | 7/1994 | Ozaki et al. ............. 324/750.22 |
| 6,730,905 B2 * | 5/2004 | Nakagawa et al. ............ 850/61 |
| 7,022,985 B2 * | 4/2006 | Knebel et al. ................ 250/306 |
| 7,473,894 B2 * | 1/2009 | Knebel et al. ................ 250/306 |
| 2009/0178165 A1 * | 7/2009 | Shile .............................. 850/33 |
| 2010/0218284 A1 * | 8/2010 | Jahnke .............................. 850/1 |

* cited by examiner

*Primary Examiner* — Nikita Wells
(74) *Attorney, Agent, or Firm* — Smith Patent Office

(57) ABSTRACT

The present invention relates to a method for providing a measuring probe (1, 1a, 2) for a probe microscopic examination of a sample in a probe microscope, in particular a scanning probe microscope, in which the measuring probe (1), which has a probe base (1a) and a probe extension (2) formed thereon, is held on a carrier device and the measuring probe (1) is processed before or after a measurement by detaching a section of the probe extension (2). The invention further relates to an arrangement having a probe microscope for the probe microscopic examination of a sample, in particular a scanning probe microscope.

28 Claims, 4 Drawing Sheets

Figure 1:
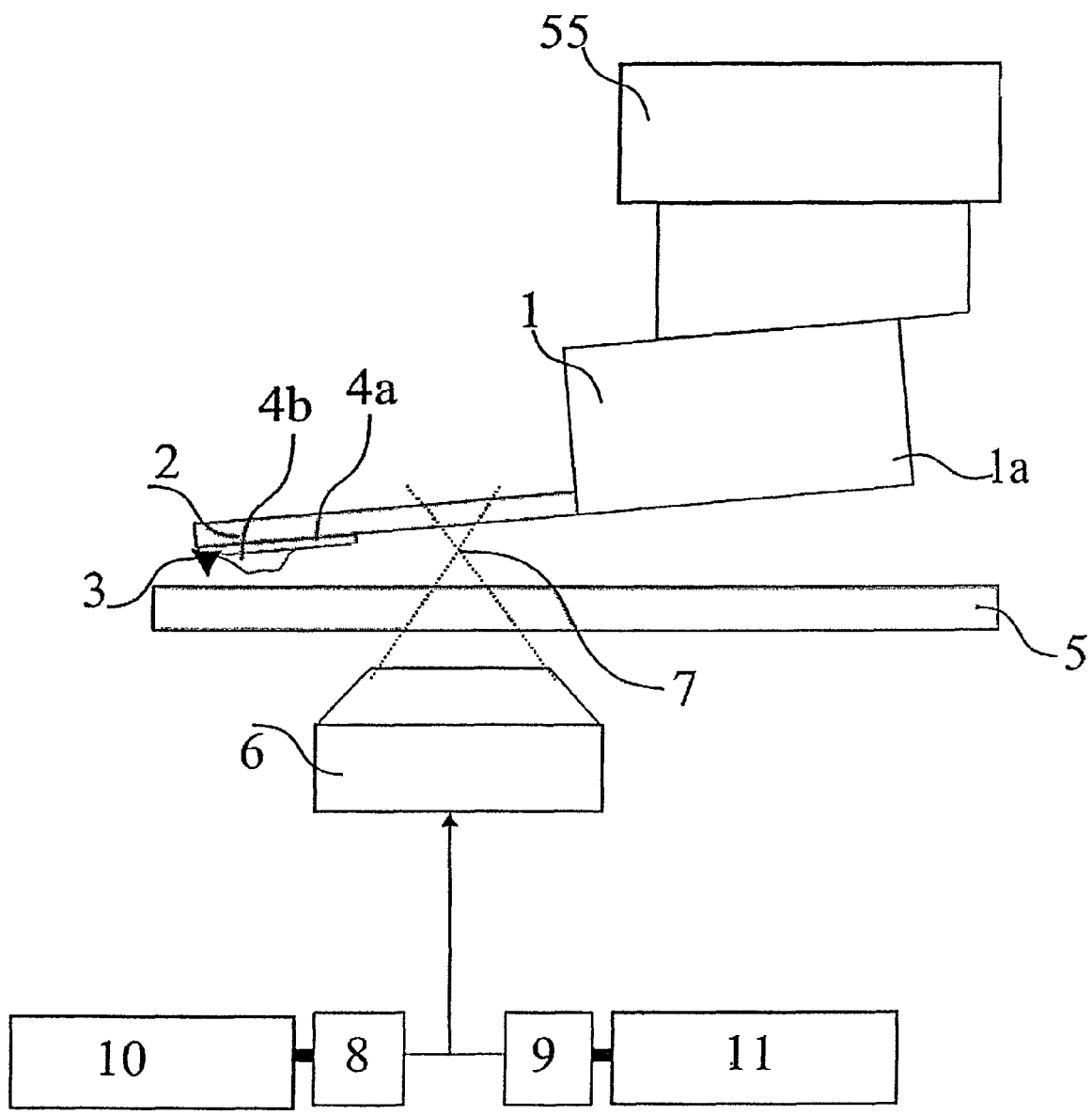

METHOD FOR PROVIDING A PROBE FOR A PROBE-MICROSCOPIC ANALYSIS OF A TEST SAMPLE IN A PROBE MICROSCOPE AND ARRANGEMENT WITH A PROBE MICROSCOPE

The invention relates to a method for providing a measuring probe for a probe microscopic examination of a sample in a probe microscope, in particular a scanning probe microscope, and an arrangement having a probe microscope for the probe microscopic examination of a sample.

BACKGROUND OF THE INVENTION

One measuring and analytical technique in probe microscopy is scanning probe microscopy (SPM), in which a measuring probe is made to scan over a sample of measuring medium to be examined and a topography of the sample is determined by way of an gap-dependent interaction between the measuring probe and the sample. It is also possible to obtain material constants or other information on the sample. Well-known examples of this technique are the atomic force microscope (AFM) and the scanning tunneling microscope (STM). Other examples include, in particular, the scanning near field microscope (SNOM) and the scanning photone force microscope (SPhM).

In gap spectroscopy for measuring the gap-dependent interaction between the measuring probe and the sample, the measuring probe is displaced relative to the surface of the sample, for example in a vertical direction to the sample surface, and the interaction between the measuring probe and the sample is measured. Alternatively the sample may also be moved. It is also possible to provide for a relative movement between the measuring probe and the sample, in which both the measuring probe and the sample are moved. In scanning probe microscopy this gap spectroscopy for measuring the interaction between the measuring probe and the sample is used, for example, to measure forces between molecules, one molecule bonding to the measuring probe and another molecule to the sample. This is also referred to as force spectroscopy.

A component in which a base part—also known as a chip—and a thin measuring probe extension, which is also referred to as a cantilever, are formed, is generally used as measuring probe. The cantilever may be of bar-shaped design, for example, or may form a triangle with two side arms. The end of the cantilever remote from the base part (chip) may have an additional tip. In addition there are also embodiments having a plurality of extensions to the base part—so-called multi-cantilevers. Cantilevers may be composed not only primarily of silicon or silicon nitride with and without metallization, but also of plastics or polymers, such as SU-8, for example. In common usage no distinction is generally made between chip and cantilever, the entire unit instead being referred to as a cantilever. Without limiting the universality of the invention, in the following explanations reference will be made to a measuring probe. The statements will apply analogously to other forms of measuring probes in probe microscopy.

The use of both untreated and pre-treated cantilevers is known in gap spectroscopy. Using a pre-treated cantilever it is possible, in particular, to analyze specific bonds. The standard practice is to bond molecules to the measuring probe embodied as a cantilever, which together with the bonded molecule(s) then form a receptor-ligand system, for example. Also known is the practice of bonding whole cells or micro-particles to a measuring probe in the form of a cantilever and bringing this system into interaction with a sample, such as a biomaterial, for example, or with other cells. Both the coating of a pre-treated cantilever and the objects such as cells or micro-particles adhering to it will hereinafter be referred to as the probe substance.

In the probe microscopic examination the probe substance may alter and sometimes age due to contact with the sample. This may affect both the actual coating and also the state of the cells, for example in respect of the metabolism, the physiology and the activation. Furthermore it will become important, in the further use of probe microscopy in cell biology and biomedical research, to further examine the probe substance which was in contact with the sample. It would be particularly advantageous, in the handling of biological samples, if these could be used further in a germ-free or sterile and gentle manner. At present the cantilever must be removed after the measurement. To do this, the system must be taken out of the sample vessel with the surrounding fluid. This procedure in particular carries the risk that 1) the objects that have adhered are torn off by the surface tensions, 2) contamination will occur during removal of the cantilever and 3) damage to the objects will occur due to the increased time taken.

The prior art discloses how living cells as a measuring probe can be applied to an individual cantilever (cf., for example, Taubenberger A. et al.: *Revealing early steps of $\alpha_2\beta_1$ integrin-mediated adhesions to collagen type I using single-cell force spectroscopy*, Molecular Biology of the Cell (2007) 18, 1634-1644). Here a cantilever is modified biochemically with Concavalin A, for example, so that the cell is strongly bonded to its surface once the cantilever has been brought into direct contact with the cell for a specific contact waiting time. The cell is then firmly bonded. Very large forces (typically >5 nN) are required in order to detach this cell again. Furthermore, after detaching the cell the surface is so modified that no further cell can be reattached.

SUMMARY OF THE INVENTION

The object of the invention is to create a method for providing a measuring probe for a probe microscopic examination of a sample in a probe microscope and an arrangement having a probe microscope, which will allow more efficient, user-friendly handling of the measuring probe.

According to the invention this object is achieved by a method for providing a measuring probe for a probe microscopic examination of a sample in a probe microscope according to the independent claim 1 and an arrangement having a probe microscope for the probe microscopic examination according to the independent claim 14. Advantageous configurations of the invention form the subject matter of the dependent subclaims.

The invention encompasses the idea of a method for providing a measuring probe for a probe microscopic examination of a sample in a probe microscope, in particular a scanning probe microscope, in which the measuring probe, which has a probe base and a probe extension formed thereon, is held on a carrier device and the measuring probe is processed before or after a measurement by detaching a section of the probe extension.

According to a further aspect of the invention an arrangement having a probe microscope for the probe microscopic examination of a sample, in particular a scanning probe microscope, is created, in which a measuring probe, which has a probe base and a probe extension formed hereon, is held on a carrier device, and a separating device is provided, which is configured to process the measuring probe before or after a measurement by detaching a section of the probe extension.

The invention allows sections of the probe extension of the measuring probe to be detached before or after a probe microscopic examination. In this way it is possible, for example, to detach a used section of the probe extension from the measuring probe, so that this can then be used again for a probe microscopic examination. However, it also allows a section, which is to be used later for a further examination, to be detached from the measuring probe. Detaching the section of the probe extension may also mean that a part of the probe base is also detached. In another configuration the detachment of a section of the probe extension involves the partial or complete removal of a coating.

The invention can advantageously be used in connection with a measuring probe embodied as a cantilever. The detachment of a section of the probe extension can be undertaken repeatedly, not only in the case of cantilevers but with any measuring probes, for example after or before a plurality of partial measurements. If further use of the measuring probe is planned after detaching the section of the probe extension, the detachment is performed so as to preserve the function of the measuring probe.

In a preferred further development of the invention the detachment of the section of the probe extension comprises a photo-optical separation step. The photo-optical separation can be performed, for example, by the use of laser light. Alternatively light provided by a non-laser light source may be focused for the purpose of detachment. A nitrogen laser separately coupled in via a microscope lens may be used to bring about the detachment. The light energy used may be locally metered so that any heating and vibrations that occur have scarcely any or no influence on surrounding areas. By means of a focused laser beam it is thus possible, for example, to detach sections of the probe extension, which carry a probe substance. For a further reduction in such unwelcome influences, the separation is not performed in immediate proximity to the target object, but is offset by several focal radii. In a typical force spectroscopy experiment with a probe microscope it may be necessary to suitably remove a cell, which is situated on the probe extension and which is also referred to as a particular probe substance, in order to use it in the live state for a further examination.

In a purposeful configuration of the invention it can be provided that the detachment of the section of the probe extension may comprise a mechanical separation step. In one configuration the mechanical separation step is performed by the action of a mechanical force, for example by pressing or knocking the measuring probe against an edged object. Here it can be provided that the object itself can be positioned in order to bring it into a suitable position for the detachment step. In this way the object, when not in use, can be selectively shifted out of the area of the measuring probe. It can also be provided that the detached section of the probe extension remains adhering to an adhesive surface. The possibility to displace the object creates scope for displacement of the detached section itself. In one configuration the mechanical detachment may be performed by means of a device comparable to a one-armed, mechanical pincer, which travels up to the cantilever and presses it until a part is detached. Here a further idea of the invention is based on the idea that a detaching unit in turn has a pincer function and receives the detached cantilever part and positions it in this same receptacle or transfers it into another chamber.

Excessive mechanical stressing of a probe substance, such as biological cells, can lead to irreversible damaging of the latter. For this reason it is important to avoid exerting an unduly large compressive force on the desired sections of the probe substance, as may be the case when merely breaking off the cantilever at a substrate base. In this case damage may be occasioned both by the pressure on a breaking edge and by the fact that the detached part of the probe extension drops onto the base, producing a compressive, force which damages the probe substrate.

In an advantageous embodiment of the invention it is provided that the section of the probe extension is detached along a predefined parting line. The predefined parting line may take the form of a parting mark or a predetermined breaking point.

The latter permits a rapid and reliable detachment. One or more predetermined breaking points can be produced, for example, by means of etched transverse structures or transverse metal or lacquer strips, which are particularly laser light-absorbent and are therefore especially suitable for laser processing.

One further development of the invention preferably provides that a section loaded with a probe substance is detached as a section of the probe extension. For example, the probe extension may be loaded with one or more cells. A chemical coating may also be formed at least in sections. In this configuration the laser light, for example, may be used to remove or to modify the chemical coating, so that an attachment occurs only in the area of a tip and a cell cannot migrate. Alternatively the laser can also be used to activate the surface of the probe extension, so that one or more cells are attached as probe substance only in an activated area. If the probe substance is consumed in the course of a probe microscopic examination, such used probe substance can be separated from the measuring probe in the detachment process. However, a section with a still-serviceable probe substance may be detached in order to use this section of the measuring probe, which may also optionally comprise a section of the probe base, for the first time or again in a subsequent examination.

In an advantageous configuration of the invention it can be provided that the detached section of the probe extension may be received in a deposition area. The deposition area may be filled with a fluid, into which the detached section of the probe extension passes. Thus, for example, a probe substance may be held on the detached section in a fluid environment, which acts to maintain the function. For example, the detached section may in this way undergo further sterile cultivation. The deposition area can be integrated into a measuring cell used for the probe microscopic examination or formed separately from this. It may be provided in a culture flask or a waste container. In one purposeful configuration the deposition area may also be integrated into an array arrangement.

In one exemplary embodiment it is proposed that a sample receptacle or a sample chamber has a subdivision into at least two chambers. One sub-chamber contains the sample for examination, and in a further sub-chamber the cantilever parts are detached. The two sub-chambers are separated from one another by a partition wall. Once the measurement is completed, the cantilever first travels in the spatial directions so that it is positioned above the partition wall. The cantilever is then slowly lowered on to the partition wall in such a way that the part of the probe extension to be detached is situated in the area of the detachment sub-chamber. The position of the cantilever relative to the partition wall is known from position monitoring. The cantilever is run downwards until it breaks off. It is advantageous if the bending of the cantilever is used to monitor the approach to the partition wall, in order to detach the cantilever or parts thereof reliably and carefully. Here the breaking may also be performed against an edge, which does not at the same time constitute the partition wall. This would, for example, already been given with a further subdivision in one of the sub-chambers.

For example, the sample chamber contains an area with an arrangement of troughs. This arrangement may be structured in trough shapes, for example, in silicone, various plastics such as polycarbonate or PDMS (polydimethyl siloxane). The cantilever is positioned over a trough and is run against a trough edge so that the cantilever breaks off and remains in the trough. It is particularly advantageous in the case of an array-like arrangement that the detaching movement can be easily automated and the bending of an AFM tip, for example, is used to monitor the breaking pressure. The array-like arrangement also makes it possible to assign the individual detached cantilever parts to the respective array trough. In the case of the array-like arrangement the detachment of the cantilever need not necessarily be performed by a mechanical element. It is also possible for the detachment to be performed by means of laser light.

In a further development of the invention the detached section of the probe extension is stored under germ-free or sterile ambient conditions. In one embodiment the aforementioned troughs may be used for this purpose.

In a preferred further development of the invention it is provided that a spring constant of the measuring probe is adjusted in conjunction with the detachment of the section of the probe extension. The spring constant can be adjusted by modifying the probe extension in various ways. These include, for example, a shortening and a thickness processing. In one configuration the latter can be performed by removing a coating. However, a specific modification to the shape of the probe extension may also be provided, for example tapering the probe extension towards a tip. Alternatively or in addition areas may be cut out of the probe extension, optionally by making openings. The length of the probe extension, which is also referred to as the cantilever bar, has a determining influence on the spring constant. If identically sized sections are always purposely detached, the spring constant can easily be modified without the need to make any changes to the experimental set-up itself. This can be used to afford an improved, high-resolution measurement. Alternatively, it is also possible to conduct separate experiments using the shortening cantilever, the spring constant then being re-determined each time. If a piece of the same size is always detached from the cantilever, it is also possible, after prior calibration, to work with fixed material characteristics.

In a purposeful configuration of the invention it can be provided that a surface formation of the measuring probe is modified by the detachment of the section of the probe extension. The surface formation can be modified, for example, by stripping off sections of a chemical coating, which is formed on the probe extension.

In an advantageous embodiment of the invention it is provided that the measuring probe is formed as an arrangement of a plurality of individual measuring probes and at least one of the constituent measuring probes is detached by the detachment of the section of the probe extension. The arrangement of a plurality of individual measuring probes is also referred to as an array.

In one further development of the invention it is provided that the section of the probe extension is preferably detached by means of an automatic separating device. The automatic separating device may be embodied as an optical or mechanical separating device, for example. It may be incorporated in the probe microscope or may be formed separately from the latter. The automatic separating device may be coupled to an optical image recognition system, which in particular registers images of the area of the measuring probe, in order to provide image information for the operation of the automatic separating device when detaching the section of the probe extension. In this context an image evaluation software may preferably be used to derive control signals for the automatic separating device.

In an advantageous configuration of the invention it can be provided that the measuring probe may be registered by means of an image recording device for processing with the automatic separating device. The image recording device may be integrally formed with the separating device or the probe microscope.

In one further development of the invention it can be provided that the section of the probe extension is held by means of a receiving device during and/or after detachment. The receiving device may be embodied as a pincer device, for example. A pipette device may also be used. The receiving device may be formed integrally with or separately from the separating device or the probe microscope in various embodiments.

The explanations given for corresponding details of the method apply analogously to advantageous configurations of the arrangement having a probe microscope for the probe microscopic examination a sample.

DESCRIPTION OF PREFERRED EMBODIMENTS OF THE INVENTION

Figure 2A:
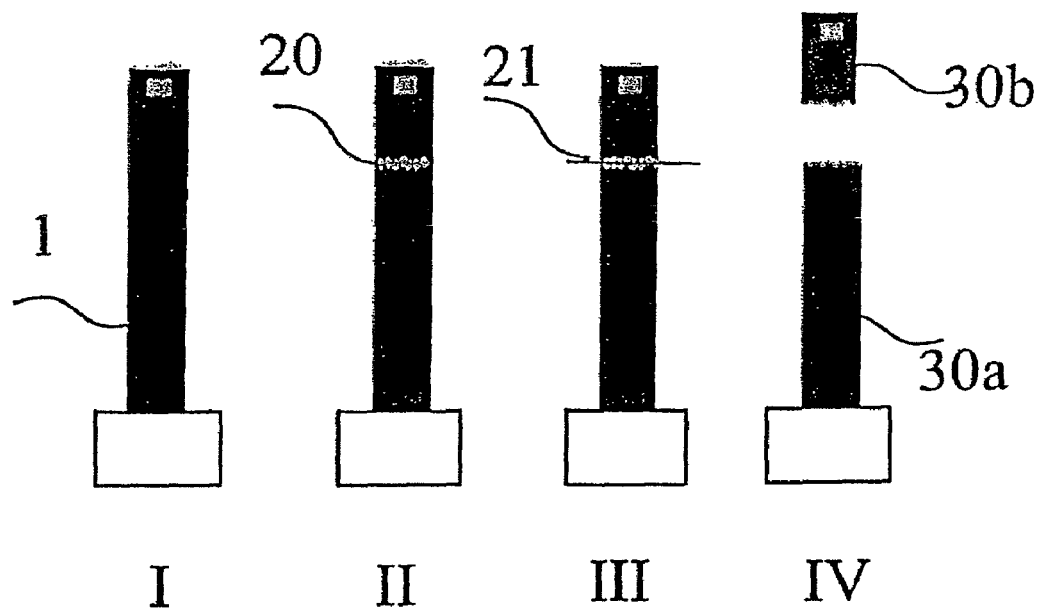
Figure 2B:
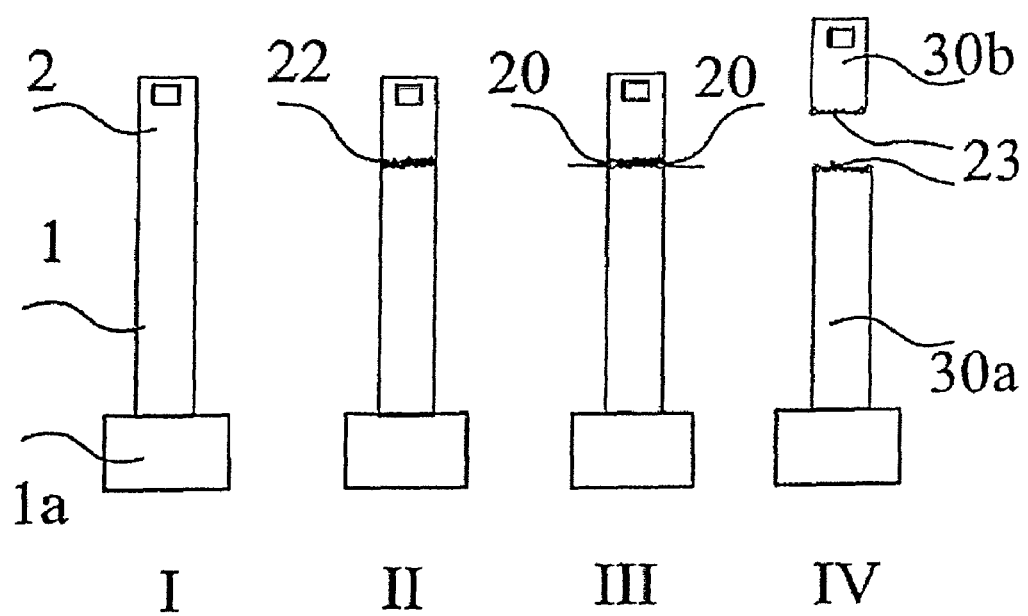
Figure 3:
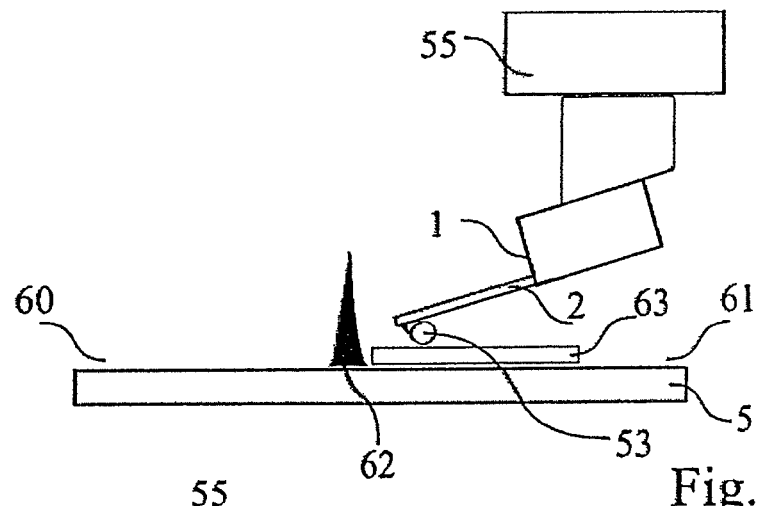
Figure 3:
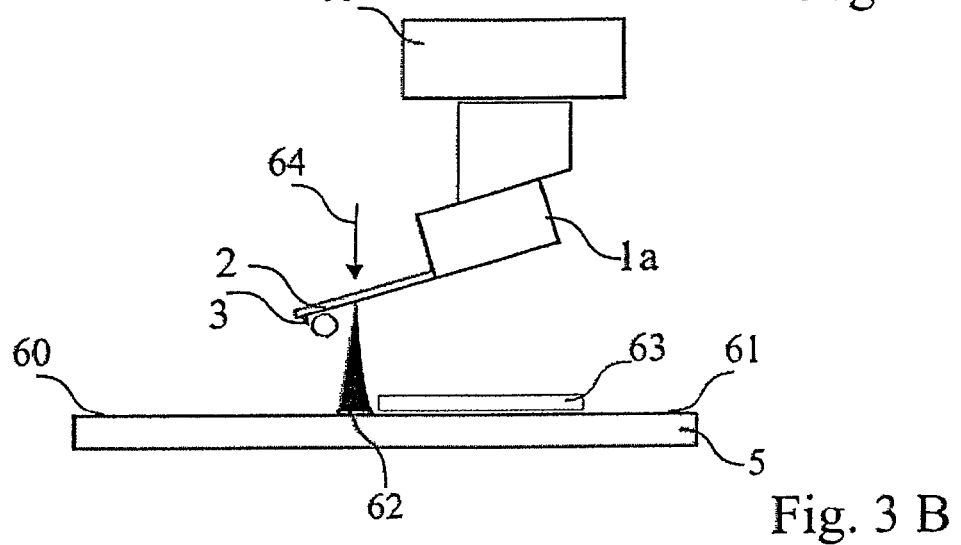
Figure 3:
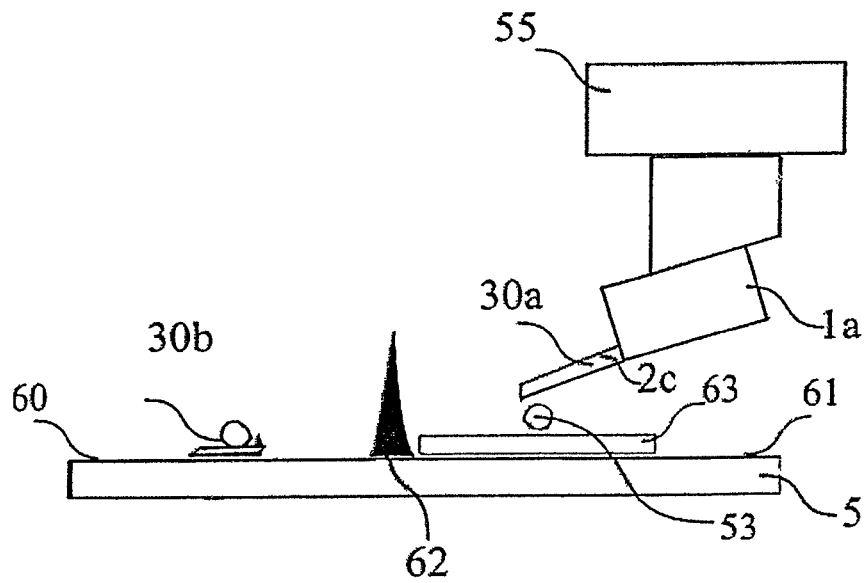
Figure 4:
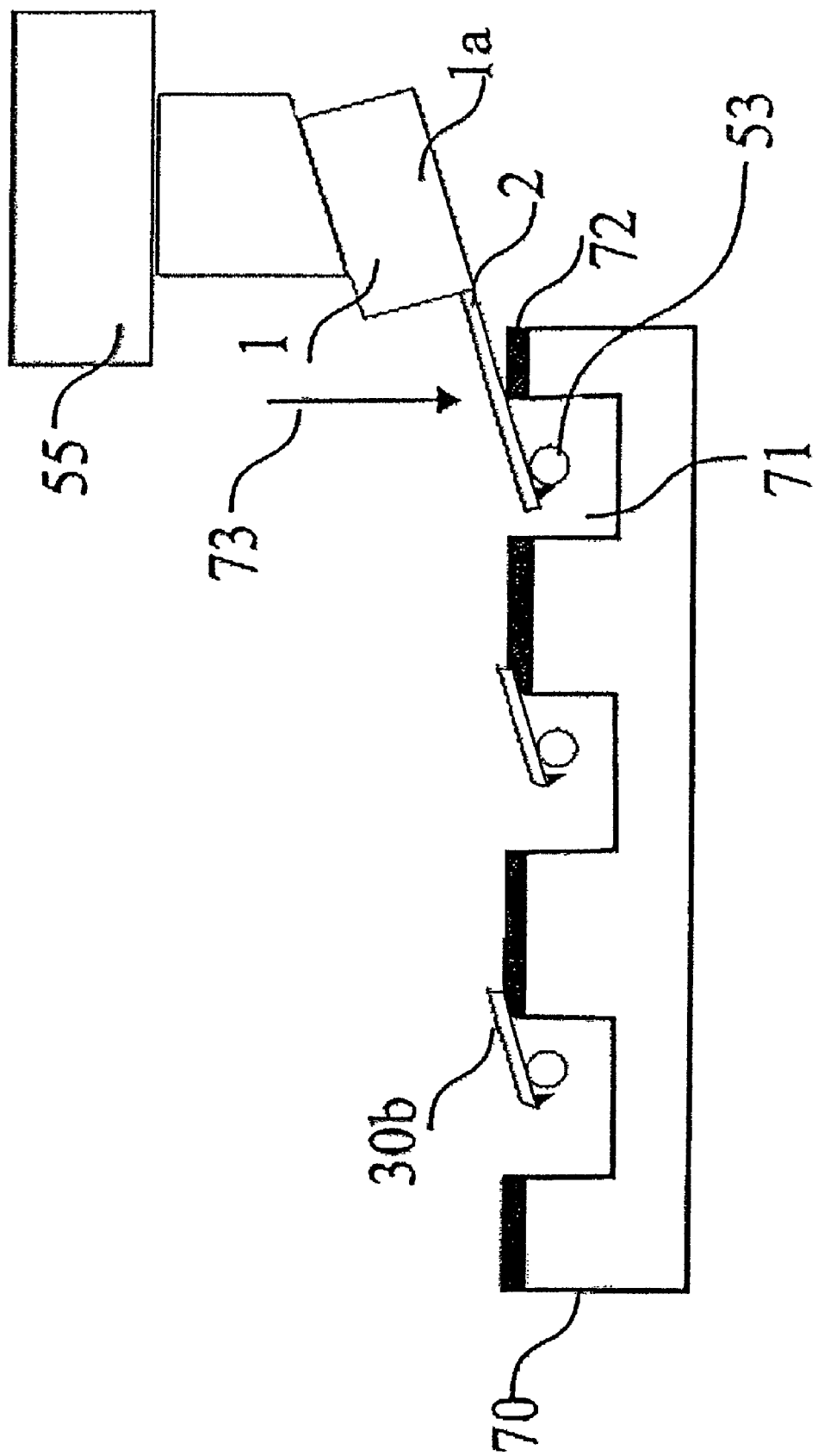

The invention will be explained in more detail below on the basis of preferred exemplary embodiments and with reference to the figures of a drawing, in which:

FIG. 1 shows a schematic representation of a set-up, with which a detachment of a section of a probe extension of a measuring probe by means of laser light can be carried out, FIG. 2A shows a schematic representation of the detachment of a section of a probe extension of a measuring probe, which has a gold coating, FIG. 2B shows a schematic representation of the detachment of a section of a probe extension of a measuring probe, which is not metalized, FIG. 3A-3C show a schematic representation of a mechanical method for the detachment of a section of a probe extension of a measuring probe, and FIG. 4 shows a schematic representation with an array arrangement.

FIG. 1 shows a schematic representation of a set-up with which a laser detachment of a section of a probe extension of a measuring probe 1 can be carried out. The measuring probe 1 embodied as a cantilever is processed by means of UV laser light. The measuring probe 1 has a cantilever chip, which consists of a solid base 1a, at the end of which a thin, flexible extension (probe extension 2) is formed, which is also referred to as a cantilever. A pyramidal tip 3 is formed at the end of the probe extension 2. In the exemplary embodiment shown a probe coating is furthermore represented, having a molecular coating 4a and a particular coating 4b with a cell. The measuring probe 1 is attached to a unit 55, making it height adjustable and even adjustable in all three spatial directions. The measuring probe 1 with the cantilever chip 1a and the probe extension 2 are situated on top of a carrier 5, which is embodied as an object carrier or a Petri dish. A microscopic examination may be performed via a lens 6. The lens 6 here in general terms symbolizes an entire optical set-up for microscopic observation. At a point of intersection 7 of a beam path lies the optical image focus. The UV laser light from a UV laser 10 can be coupled-in and moved by way of an adjusting element 8. In addition an IR laser 11 with a corresponding adjusting element 9 is provided, which is likewise capable of providing laser light for the laser-optical treatment of the measuring probe.

FIG. 2A shows a schematic representation of the detachment of a section of a probe extension of a measuring probe, which has a gold coating.

Various types of cantilevers may be used. Exemplary embodiments will be explained below in connection with three different types: type 1: V-shaped cantilever with pyramid and gold coating; type 2: three individual rod-shaped cantilevers made from SiN, type 3: a single rod-shaped Si cantilever made from Si (hydrophobic).

A laser system with an IX 70 Olympus reverse microscope and an $N_2$-Laser (337 nm, UV light) were used as processing system for the detachment. The laser light energy was adjustable between relative units from 1 to 1000 (min-max value). For conducting the experiment the cantilevers as sketched in FIG. 1 were placed with their tips (pyramid tip towards the glass base and lens) in a Petri dish having a thin glass bottom and covered with distilled water.

FIG. 2A shows the handling of a gold-coated cantilever arm of type 1 in four steps I to IV. In step I, the optical focus and the focus of the $N_2$ laser are adjusted to the object. In step II it was possible to remove circular material pieces 20 from the cantilever very easily and with a low energy input (medium energy setting). In transmitted light these areas appear brightly transparent. The gold coating with underlying chrome base means that the ablation efficiency is very high. At the same time the metallization prevents that parts of the cantilever become prematurely detached from one another. In step III, separation occurs only after the last laser light bombardment, which completely removed the material (permeable bright section in transmitted light, sketched as line 21). In step IV, there is a detached part of the cantilever 30b, which carries the probe substance or at least a significant proportion, along with a shortened cantilever 30a having a modified spring constant.

FIG. 2B shows a schematic representation of the detachment of a section of a probe extension of a measuring probe, which is non-metalized.

A SiN cantilever of type 2 could be detached with an energy input somewhat higher than for type 1. The separation does not produce a permeable bright section in the transmitted light, but shows a dark stained deposit 22. A more directed focusing of the laser then allowed a complete material removal 20. The severing 20 by means of a laser need not be entire, however, the cantilever part 30a already positively coming off after half of the section has been processed in this way. Here the cut face 23 in type 2 and type 3 produces a relatively smooth edge with some dark processing aggregations.

In the experiment the Si cantilever arm of type 3 could be detached with a medium energy input. The separation occurred in a manner similar to type 2, the detachment occurring significantly more smoothly and abruptly without performing a complete material removal.

The actual AFM tips remained visually intact after the respective experiment.

FIGS. 3A to 3B show a schematic representation of a mechanical method for detaching a section of a probe extension of a measuring probe.

FIG. 3A shows a cantilever 1, consisting of a thin, flexible bar 2, which is formed on the cantilever base 1a (cantilever chip). On a suitable carrier 5 the measuring chamber is divided into two areas by means of a partition wall 62. The walls of the measuring chamber are not shown here. An SPM measurement for examination of the interaction of a probe substance 53 with a functionalized substrate 63 in a suitable aqueous solution is performed in an area 61. The cantilever 1 is attached by means of a unit 55 and is movable in all three spatial directions. A second area of the measuring chamber accommodates the area 60, in which the cantilever or parts thereof are deposited. Alternatively the measuring chamber may also be moved relative to the cantilever 1.

In FIG. 3B the cantilever complex 1, 3, 53, 55 is positioned over the partition wall 62 so that the part of the cantilever with the probe substance 53 that is to be detached is situated in the section of the second chamber area 60. Now, a relative movement of the cantilever towards the edge of the partition wall takes place, as is illustrated by the arrow 64. While doing so, both the cantilever, via the unit 55, and the sample carrier can be moved. If the shear pressure is sufficiently great, a part of the cantilever is detached. Here the method in FIG. 2, for example, could naturally also be used for the purpose of detachment. The crucial thing is that the detached cantilever is deposited in a separate area.

In FIG. 3C the detached part 30b is situated in the second section 60, whilst the part of the cantilever 30a remaining on the receiver and displacing unit 55 is used to take up another micro-particle and to perform a measurement. Since the characteristics of the remaining cantilever 30a have changed, a new calibration is first performed.

FIG. 4 shows a schematic representation with an array arrangement.

An array-shaped arrangement 70 has individual troughs 71, which are suitable for the detachment and reception of parts of the cantilever 30b. The material for the array-shaped arrangement 70 may be silicone or a plastic, for example. A coating 72 is applied to the upper side of the array-shaped arrangement 70 so as to give the cantilever material an increased adhesive capacity. If the cantilever 1 and the probe substance 53 are placed over an array trough by means of the unit 55, a pressure (symbolized by the arrow 73) or tension can be applied. In the process, a part of the cantilever 30b is detached, whilst still adhering to the edge of the trough due to the adhesive characteristics of the coating 72. Also important for the detachment here is a movement of the array-shaped arrangement 70 relative to the cantilever 1, in order to achieve the detachment through pressure or tension.

The features of the invention disclosed in the preceding description, the claims and the drawing may be important to the realization of the invention in its various embodiments both individually and in any combination.

The invention claimed is:

1. A method for providing a measuring probe for a probe microscopic examination of a sample in a probe microscope, in which the measuring probe has a probe base and a probe extension formed thereon, said method comprising the steps of:

holding the measuring probe on a carrier device and separating a section of the probe extension before or after a measurement so that the probe extension is shortened.

2. The method according to claim 1, wherein the step of separating the section of the probe extension comprises a photo-optical separation step.

3. The method according to claim 1, wherein the step of separating the section of the probe extension comprises a mechanical separation step.

4. The method according to claim 1, wherein the section of the probe extension is separated along a predefined parting line.

5. The method according to claim 1, wherein a section loaded with a probe substance is separated as the section of the probe extension.

6. The method according to claim 1, wherein the section of the probe extension separated from the measuring probe is received in a deposition area.

7. The method according to claim 6, wherein the section of the probe extension separated from the measuring probe is stored under germ-free or sterile ambient conditions.

8. The method according to claim 1, further comprising the step of adjusting a spring constant of the measuring probe in conjunction with the said step of separating the section of the probe extension.

9. The method according to claim 1, further comprising the step of modifying a surface formation of the measuring probe in conjunction with the said step of separating the section of the probe extension.

10. The method according to claim 1, further comprising the steps of providing a plurality of individual measuring probes as the measuring probe and said separating a section step includes separating a probe extension of at least one of the individual measuring probes.

11. The method according to claim 1, wherein said step of separating the section of the probe extension includes using an automatic separating device.

12. The method according to claim 11, further comprising the step of registering the measuring probe by using an image recording device for processing with the automatic separating device.

13. The method according to claim 1, further comprising the step of holding the section of the probe extension by a receiving device during and/or after said step of separating the section of the probe extension.

14. An arrangement having a probe microscope for the probe microscopic examination of a sample, in which a measuring probe, which has a probe base and a probe extension formed thereon, is held on a carrier device, and a separating device, which is configured to process the measuring probe before or after a measurement by detaching a section of the probe extension.

15. The arrangement according to claim 14, wherein the separating device is configured to perform a photo-optical separating step in the detachment of the section of the probe extension.

16. The arrangement according to claim 14, wherein the separating device is configured to perform a mechanical separating step in the detachment of the section of the probe extension.

17. The arrangement according to claim 14, wherein the separating device is configured to detach the section of the probe extension along a predefined parting line.

18. The arrangement according to claim 14, wherein a deposition area is formed, which is configured to receive the detached section of the probe extension.

19. The arrangement according to claim 18, wherein the deposition area is a germ-free or sterile deposition area, which is configured to store the detached section of the probe extension under germ-free or sterile ambient conditions.

20. The arrangement according to claim 14, wherein the separating device is configured to adjust a spring constant of the measuring probe in conjunction with the detachment of the section of the probe extension.

21. The arrangement according to claim 14, wherein the separating device is configured to modify a surface formation of the measuring probe in conjunction with the detachment of the section of the probe extension.

22. The arrangement according to claim 14, wherein the measuring probe is formed as an arrangement of a plurality of individual measuring probes and the separating device is configured to detach at least one of the constituent measuring probes by means of the detachment of the section of the probe extension.

23. The arrangement according to claim 14, wherein the separating device is embodied as an automatic separating device.

24. The arrangement according to claim 14, wherein an image recording device is provided, which is configured to register the measuring probe for processing with the separating device.

25. The arrangement according to claim 14, wherein a receiving device is provided, which is configured to hold the section of the probe extension during and/or after detachment.

26. The arrangement according to claim 14, wherein the separating device is integrally formed with the probe microscope.

27. The arrangement according to claim 14, wherein the probe microscope is a scanning probe microscope.

28. The arrangement according to claim 27, wherein the scanning probe microscope is an atomic force microscope.

* * * * *